United States Patent [19]

Deak

[11] 4,373,098

[45] Feb. 8, 1983

[54] PROCESS FOR CONVERTING CELLULOSE DIRECTLY INTO ALKALI CELLULOSE

[75] Inventor: Gedeon I. Deak, Wilmington, Del.

[73] Assignee: E. I. Du Pont de Nemours and Company, Wilmington, Del.

[21] Appl. No.: 294,790

[22] Filed: Aug. 20, 1981

[51] Int. Cl.$^3$ ............................................. C08B 1/08
[52] U.S. Cl. ..................................... 536/101; 536/60
[58] Field of Search ................................ 536/101, 60

[56] References Cited

U.S. PATENT DOCUMENTS

| | | | |
|---|---|---|---|
| 1,858,017 | 5/1932 | Lilienfeld | 536/94 |
| 2,274,463 | 2/1942 | Stoeckly et al. | 536/101 |
| 2,735,846 | 2/1956 | Richter, Jr. | 536/101 |
| 3,615,254 | 10/1971 | Eichenseer | 422/225 |
| 3,857,833 | 12/1974 | Warzecha et al. | 536/101 |
| 3,914,130 | 10/1975 | Newcomer | 536/101 |
| 4,269,973 | 5/1981 | Geyer et al. | 536/101 |

FOREIGN PATENT DOCUMENTS 1066588 4/1967 United Kingdom ................ 536/101

*Primary Examiner*—Ronald W. Griffin

[57] ABSTRACT

A direct process for converting cellulose into alkali cellulose for subsequent production of a filterable viscose by combining particles of cellulose with the largest 1% of the particles having a minimum size Y of less than 600 microns and the bulk density X of the particles being greater than 0.2 g/cm$^3$ such that the relationship between X and Y is defined by the equation Y−760X≦50; and 125 g to 240 g of 20–40% aqueous NaOH for each 100 g of cellulose for at least 4 minutes at 15°–60° C.

4 Claims, 2 Drawing Figures

PROCESS FOR CONVERTING CELLULOSE DIRECTLY INTO ALKALI CELLULOSE

BACKGROUND

Many different processes for the conversion of cellulose into alkali cellulose for subsequent xanthation and viscose production are known in the art. Generally, wood pulp is converted into alkali cellulose by treatment with caustic steeping processes. The resulting alkali cellulose is then xanthated to form a soluble cellulose xanthate, which, after being treated with a dilute aqueous caustic solution, results in an acceptably filterable viscose.

One of the early processes for conversion of cellulose into alkali cellulose consists of treating sheets of cellulose with a dilute solution of NaOH, pressing the excess NaOH solution out of the resulting alkali cellulose and shredding the alkali cellulose into particles, which, upon xanthation, would produce an acceptably filterable viscose. This process, however, requires an excess of NaOH solution to achieve a desirable concentration of caustic in the cellulose. The excess NaOH pressed out of the cellulose is contaminated with hemi cellulose and hence is difficult to recycle into the alkalyzing step of the process. Further, significant degradation of the cellulose occurs due to the length of contact time with the excess NaOH solution.

In order to reduce NaOH waste, another process of the prior art contacts a measured quantity of pulverized cellulose with a mist of sprayed aqueous NaOH solution. The heart of this process is the suspension of the cellulose particles in the atmosphere of the reaction vessel using gaseous countercurrents until the particles are wetted with the caustic spray. Consequently, due to the increase in weight, these particles fall out of the atmosphere of the reaction chamber and out of contact with the caustic spray.

SUMMARY OF THE INVENTION

The process of the subject invention allows for the direct conversion of cellulose into alkali cellulose from cellulose particles of a particular size and shape, the latter defined by the bulk density of the particles, with a minimum amount of aqueous NaOH, thus eliminating both NaOH waste and the need for a complex mixing apparatus. This alkali cellulose is then used in the production of an acceptably filterable viscose. More particularly, the subject invention is a process for converting cellulose into alkali cellulose which comprises combining finely divided particles of cellulose with 125 g to 240 g of 20–40% aqueous NaOH for each 100 g of cellulose for at least 4 minutes at 15°–60° C.

Further, the subject invention is a process for converting cellulose into an acceptably filterable viscose comprising: combining (a) particles of cellulose with the largest 1% of the particles having a mimimum size of less than 600 microns and the bulk density of the particles being greater than 0.2 g/cm$^3$ such that the relationship between X, the bulk density in g/cm$^3$ and Y, the particle size in microns, is defined by the equation Y-760X≦50; and (b) about 125 g to 240 g of 20–40% aqueous NaOH for each 100 g of cellulose for at least 4 minutes at 15°–60° C. such that the resulting alkali cellulose contains 13% to 16% NaOH and 28% to 40% cellulose. Of course, the amount of caustic necessary may vary slightly with the water content of the pulp used. Generally, commercially available pulp contains about 5% to 10% water by weight. This alkali cellulose is then aged until the 1% CED viscosity is 0.006 to 0.009 Pa-s (TAPPI Test No. T230-OS-76), xanthated, cooled and treated with dilute NaOH to arrive at a viscose having an FSC filtration value of greater than 5000.

DETAILED DESCRIPTION

Figure 1:
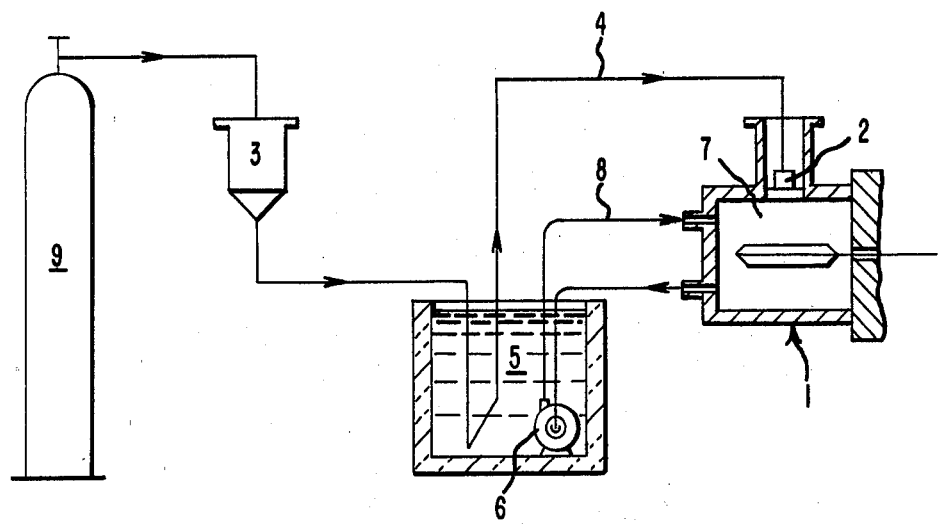
FIG. 1 is an experimental setup used to practice the subject invention.

Conventional methods can be used to mix cellulose and caustic when the dimensions of the cellulose particles defined by the subject invention are used. In FIG. 1, for example, M5G Littleford Batch Mixer 1, manufactured by Littleford Bros. Inc., Florence, Ky. contains cellulose particles with dimensions defined below. The cellulose particles are agitated for at least 4 minutes while being sprayed with about 125 g to 240 g of 20–40% aqueous NaOH for each 100 g of cellulose from spray nozzle 2 which is charged by caustic feed tank 3 through feed line 4. Constant temperature water bath 5 is used to keep both the caustic in feed line 4 and water pumped from water pump 6 around mixer 1 at a constant temperature, monitored by thermocouples in water bath 5, chamber 7 and line 4. Cylinder 9 containing $N_2$ maintains caustic feed tank 3 under constant feed pressure. A conventional fluid bed mixer can also be used in the practice of the subject invention as long as the size and shape dimensions of the cellulose particles defined below are used.

The process of the subject invention requires the cellulose particles to be ground such that the size and shape of the particles satisfy three criteria: first, the largest 1% of the particles must have a minimum size Y of less than about 600 microns; second, the bulk density X of the particles must be greater than 0.2 g/cm$^3$; third, the relationship between X and Y must be defined by the equation Y-760X 50.

The first of these three criteria, the particle size, can be determined by a Tyler screen analysis and defined by the size of the screen openings which will pass through 99 weight percent of the cellulose particles. The lower limit of Y is dependent only upon the equation expressing the X and Y relationship shown above, and the physical limitations involved in reducing the size of these particles. As a practical matter, a powder with Y smaller than 20 microns would be difficult to produce by conventional grinding means.

The second criteria, bulk density, is measured using conventional methods. The method used here was as follows: A tared 250 ml graduated cylinder was filled with the particles, sealed with a rubber stopper, hand tapped 100 times, refilled to the 250 ml mark and hand tapped until complete settling occurred. The cylinder was removed from the shaker and weighed, the bulk density calculated as the weight of the particles in grains divided by the volume in cubic centimeters.

The third criteria is the relationship between the size and the shape of the cellulose particles, again, the latter defined using bulk density. Particles with a minimum size of the largest 1% of the particles Y, in microns, and bulk density X, in g/cm$^3$ relationship such that Y-

Figure 2:
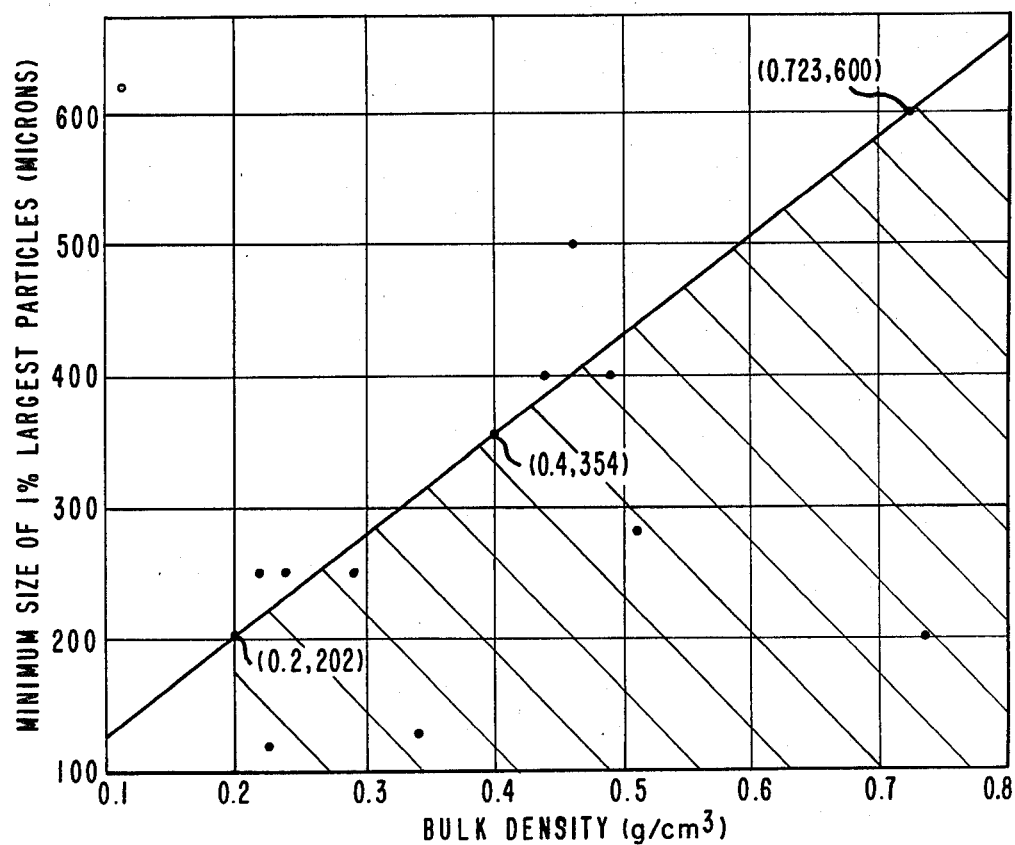
FIG. 2 is a graphical representation of the relationship between the size and shape of cellulose particles necessary to practice the subject invention.

760X≦50, when mixed with a NaOH solution described below using conventional mixing means, will produce alkali cellulose that, upon xanthation, will result in an acceptably filterable viscose. This linear relationship was derived as a result of experimental data described in Example III below, depicted in the graph of FIG. 2. The shaded area of the graph represents the area within which lies cellulose particles with dimensions, which, upon the direct alkalization of the subject invention and subsequent xanthation will result in an acceptably filterable viscose.

The definition of an acceptable filterability is that viscose which will not detrimentally clog a filter process, i.e., a viscose with an FSC filtration value of at least 5000. This FSC filtration value is determined by pumping viscose through a filter cloth made of nylon felt having a unit weight of 0.95 to 1.02 kg/m$^2$, thickness of 3.8 mm and air permeability of 4.7–7.1 liters per second. The area of the filter is a circle with a diameter of 10 cm. The pumping rate is maintained at a constant 26 cm$^3$/min. for 21 minutes after the entire filter cloth is wetted with viscose. Pressure drop across the filter is measured every minute and plotted on semilog paper, the pressure on the logarithmic axis calibrated such that one decade measures 25.4 cm, the time on the linear axis calibrated such that 1 minute measures 2.54 cm. Measuring the angle α between the tangent of the resulting curve at the end of 21 minutes and the linear time axis, the FSC filtration value is calculated by the following formula:

$$FSC = 600/\tan \alpha$$

This direct alkalizing process eliminates the need for a caustic slurry and the subsequent pressing step involved therewith, and reduces NaOH waste. The direct process also does not degrade the cellulose as does the slurry/press process where excess NaOH contains an appreciable amount of otherwise usable cellulose.

The caustic concentration used in the practice of the process of the subject invention, as well as the contact time necessary between the cellulose and the caustic is important in that too short a contact time or too low a caustic concentration does not result in an alkali cellulose with NaOH content high enough to produce an acceptably filterable viscose after xanthation. It is, therefore, necessary to combine the cellulose particles with dimensions defined above with 125 to 240 g of 20–40% aqueous NaOH for each 100 g of cellulose for at least 4 minutes at 15°–60° C. such that the resulting alkali cellulose contains 13 to 16 weight percent NaOH and 28 to 40 weight percent cellulose. To facilitate the wetting of the cellulose with the NaOH, a surfactant selected from the group consisting of anionic phosphate esters or nonionic condensation products of ethylene or propylene oxides, including those reacted with substituted phenols, can be added to the aqueous NaOH in a concentration of up to about 0.03% by weight of the solution. Optionally, the alkali cellulose is then tumbled for up to 6 hours at 0° to 50° C. and heated to 45° C. to 55° C. for 0 to 240 minutes such that the 1% CED viscosity of said alkali cellulose is 0.006 to 0.009 Pa-s. Of course, as evidenced by the lower limits of the above ranges, tumbling and reheating may not be necessary if the alkali cellulose has attained the desired viscosity.

The alkali cellulose is then combined with 8 to 16 mls CS$_2$ for each 100 g of alkali cellulose in an N$_2$ atmosphere for 20 minutes to 24 hours at 24° C. to 45° C. resulting in a cellulose xanthate. Finally, the cellulose xanthate is cooled to 0° C. to 30° C. and 180 to 380 mls of 0.2 to 4.0% aqueous NaOH is added for each 100 g of cellulose xanthate and the solution is agitated for 10 to 120 minutes such that the resulting viscose has FSC filtration value of greater than 5000.

EXAMPLE I

The experimental setup used is shown in FIG. 1. Hardwood pulp was ballmilled and 278 g of the resulting cellulose particles were added to an M5G Littleford mixer. The minimum size of the largest 1% of the particles was less than 340 microns and the bulk density was 0.44 g/cm$^3$. 435 g of 22.5% aqueous NaOH mixed with about 0.03 g of KMnO$_4$ were sprayed over the cellulose particles for about 5.9 minutes at about 30° C. while the mixer was agitated at 300 rpm. The KMnO$_4$, used as a catalyst for subsequent aging of the alkali cellulose, does not participate in the conversion of cellulose to alkali cellulose. The alkali cellulose was tumbled for 30 minutes at room temperature to simulate a plant manufacturing aging process carried out in a tumble drum. The resulting alkali cellulose contained 38.3% cellulose and 13.8% NaOH, the balance being water. Upon xanthation, viscous was produced with an FSC filtration value of 11,400.

EXAMPLE II

Using the same experimental setup as was used in Example I above, 270 g of ballmilled cellulose particles were added to the M5G Littleford mixer. The minimum size of the largest 1% of the particles was less than 380 microns and the bulk density was 0.62 g/cm$^3$. 455 g of 22.5% aqueous NaOH solution, along with 35 mg of KMnO$_4$ and 90 mg of "Klearfac" AA270 surfactant manufactured by BASF Wyandotte Corp., Wyandotte, Mich., were sprayed over the cellulose particles for 4.9 minutes at a temperature of 30° C. while the mixer was being agitated at 300 rpm, followed by 1 minute of mixing without further NaOH spraying. The resulting alkali cellulose contained 35.1% cellulose and 14.1% NaOH.

The alkali cellulose was tumbled for 60 minutes at 41° C. and then heated and kept at 52° C. for 20 minutes to achieve the desired CED viscosity of about 0.0079 Pa-s. 55 ml of CS$_2$ was added to 604 g of alkali cellulose after the air was purged with N$_2$. Xanthation was carried out for 40 minutes at 38° C. during which the pressure reached 57.2 kPa Hg, then dropped to 16.5 kPa Hg due to the consumption of CS$_2$. After completing xanthation, CS$_2$ is vented and purged with N$_2$, the xanthate is cooled to 16°–18° C., caustic and water are added and the mixture is agitated for one hour to arrive at viscose with an FSC filtration value of 8600.

EXAMPLE III

The equipment configuration of Example II along with similar reaction conditions were run on different size (minimum size of 1% largest particles) and shape (bulk density) cellulose particles. The results, tabulated below and graphically illustrated in FIG. 2, were used to define the operable dimensions of the cellulose particles necessary to practice the subject invention.

| Test Run | Min. Size of Largest 1% (microns) | Bulk Density (g/cm$^3$) | FSC Filtration Value of Viscose |
| --- | --- | --- | --- |
| 1 | 260 | 0.4 | 11,400 |

-continued

| Test Run | Min. Size of Largest 1% (microns) | Bulk Density (g/cm³) | FSC Filtration Value of Viscose |
|---|---|---|---|
| 2 | 280 | 0.51 | 8,600 |
| 3 | 400 | 0.49 | 10,000 |
| 4 | 250 | 0.29 | 35,000 |
| 5 | 250 | 0.29 | 6,800 |
| 6 | 65 | 0.32 | 35,000 |
| 7 | 120 | 0.26 | 35,000 |
| 8 | 125 | 0.38 | 35,000 |

EXAMPLE IV

In this example, the basic equipment configuration shown in FIG. 1 was used except that a fluid-bed spray granulator-mixer, Aeromatic Model STREA-1, manufactured by Aeromatic Corp., Bernardsville, N.J. was used in place of the Littleford mechanical mixer. 279 g of ballmilled cellulose particles with dimensions such that the minimum size of the largest 1% of the particles was less than 360 microns and the bulk density was 0.61 g/cm³ were charged into the fluid-bed chamber and 455 g of 22.5% caustic with 35 mg of $KMnO_4$ and 144 g of Klearfac AA270 wetting agent were charged into the caustic feed tank. The caustic was sprayed into the fluidized bed with 275.8 kPa through an atomizing nozzle for 4 minutes. During the spraying cycle and for 30 seconds after its completion the bed was kept fluidized with air flow of between 40 and 95 m³/hr. Air temperatures were 38° C. inflow, 29° C. outflow and 33° C. inside the fluidized bed. After xanthation, resulting viscose had an FSC filtration value of 5700.

EXAMPLE V

This example is to show that the process of the subject invention can be carried out without tumbling the cellulose particles.

Using the same experimental setup as was used in Example I above, 274 grams of ballmilled cellulose particles were added to the M5G Littleford mixer. The minimum size of the largest 1% of the particles was less than 400 microns and the bulk density was 0.57 g/cm³. 455 g of 22.5% aqueous NaOH solution, along with 35 mg of $KMnO_4$ and 144 mg of "Klearfac" AA 270 were sprayed over the cellulose particles for 5 minutes at a temperature of about 25° C. while the mixer was being agitated at 300 rpm, followed by 1 minute of mixing without further NaOH spraying. The resulting alkali cellulose contained 36.0% cellulose and 14.1% NaOH. The composition was aged for 80 minutes at 52° C. Xanthation was carried out at about 40° C. in 40 minutes consuming 55 ml of $CS_2$ the initial pressure being 53 KPa and the final pressure being 15 KPa. Following xanthation, $CS_2$ is vented and purged with $N_2$, the xanthate is cooled and about 1660 g $H_2O$ and 38 g NaOH added to arrive at a viscose with an FSC filtration value of 6,860.

COMPARATIVE EXAMPLE

The procedure of Example III was followed using cellulose particles with particle size and bulk density outside of the parameters of the subject invention. The results are tabulated below and graphically illustrated in FIG. 2, all points falling outside of the shaded area defining the subject invention.

| Test Run | Min. Size of Largest 1% (microns) | Bulk Density (g/cm³) | FSC Filtration Value of Viscose |
|---|---|---|---|
| 1 | 400 | 0.44 | 4,600 |
| 2 | 500 | 0.46 | 1,500 |
| 3 | 1000 | 0.15 | 170 |
| 4 | 250 | 0.24 | 4,600 |
| 5 | 620 | 0.14 | 1,400 |
| 6 | 250 | 0.22 | 3,200 |

I claim:

1. A process for converting cellulose into alkali cellulose which comprises combining:
   (a) particles of cellulose with the largest 1% of the particles having a minimum size Y of less than 600 microns and the bulk density X of the particles being greater than 0.2 g/cm³ such that the relationship between X and Y is defined by the equation $Y - 760X \leq 50$; and
   (b) 125 g to 240 g of 20–40% aqueous NaOH for each 100 g of cellulose for at least 4 minutes at 15°–60° C.

2. A process for converting cellulose into an acceptably filterable viscose comprising:
   (a) combining
      (i) particles of cellulose with the largest 1% of the particles having a maximum size Y of less than 600 microns and the bulk density X of the particles being greater than 0.2 g/cm³ such that the relationship between X and Y is defined by the equation $Y - 760 \leq 50$; and
      (ii) 125 g to 240 g of 20–40% aqueous NaOH for each 100 g of cellulose for at least 4 minutes at 15°–60° C.;
   (b) tumbling the resulting alkali cellulose at said temperature until the 1% CED viscosity of said alkali cellulose is 0.006 to 0.009 Pa-s;
   (c) xanthating said alkali cellulose;
   (d) cooling the resulting cellulose xanthate and adding aqueous NaOH until the resulting viscose has an FSC filtration value of greater than 5000.

3. The process of claim 1 wherein is added a surfactant in an amount up to 0.03% based on the weight of the solution.

4. The process of claim 2 wherein is added in step (a) a surfactant in an amount up to 0.03% based on the weight of the solution.

* * * * *